United States Patent
Rasanen

(10) Patent No.: US 7,242,943 B2
(45) Date of Patent: Jul. 10, 2007

(54) METHOD AND SYSTEM FOR ESTABLISHING A CONNECTION IN A TELECOMMUNICATION NETWORK HAVING DIFFERENT PROTOCOLS

(75) Inventor: Juha Rasanen, Espoo (FI)

(73) Assignee: Nokia Corporation, Espoo (FI)

( * ) Notice: Subject to any disclaimer, the term of this patent is extended or adjusted under 35 U.S.C. 154(b) by 200 days.

(21) Appl. No.: 10/036,878

(22) Filed: Oct. 31, 2001

(65) Prior Publication Data

US 2002/0077109 A1 Jun. 20, 2002

Related U.S. Application Data

(63) Continuation of application No. PCT/EP00/00527, filed on Jan. 24, 2000.

(30) Foreign Application Priority Data

May 12, 1999 (WO) ...................... PCT/EP99/03275

(51) Int. Cl.
*H04Q 7/20* (2006.01)
*H04M 1/00* (2006.01)
*H04L 12/26* (2006.01)
(52) U.S. Cl. ................... 455/445; 455/433; 455/435.1; 455/552.1; 370/352
(58) Field of Classification Search ............ 455/552.1, 455/553.1, 556.1, 557, 433, 435.1, 445, 432.1, 455/422.1, 414.1; 370/338, 356, 328, 465, 370/352, 466; 709/246
See application file for complete search history.

(56) References Cited

U.S. PATENT DOCUMENTS

| | | | | |
|---|---|---|---|---|
| 5,917,816 A * | 6/1999 | Jacobsohn | ................... | 370/352 |
| 6,081,706 A * | 6/2000 | Muths et al. | ............ | 455/412.1 |
| 6,134,433 A * | 10/2000 | Joong et al. | ................ | 455/417 |
| 6,230,024 B1 * | 5/2001 | Wang et al. | ................ | 455/557 |
| 6,349,224 B1 * | 2/2002 | Lim | ........................... | 455/466 |
| 6,370,132 B1 * | 4/2002 | Saxena | ....................... | 370/338 |
| 6,385,178 B1 * | 5/2002 | Palviainen | .................. | 370/328 |
| 6,385,195 B2 * | 5/2002 | Sicher et al. | .............. | 370/356 |
| 6,490,291 B1 * | 12/2002 | Lee et al. | .................. | 370/401 |

(Continued)

FOREIGN PATENT DOCUMENTS

EP 0477627 4/1992

(Continued)

OTHER PUBLICATIONS

International Search Report for PCT/EP00/00527.

*Primary Examiner*—Tilahun Gesesse
(74) *Attorney, Agent, or Firm*—Squire, Sanders & Dempsey L.L.P.

(57) ABSTRACT

The invention relates to a method and system for establishing a first type of connection, wherein a handshake processing is performed with the other party of the first type of connection. If the handshake processing is successful, the first type of connection is established. If the handshake processing is not successful, i.e. the other party does not support the first type of connection, a fallback procedure is started to change the call to a second type of connection determined during the connection establishment. The change to the second type of connection may be performed directly or may be based on a call retry procedure. Thereby, inconvenient disconnections or error processings at the end terminals can be prevented.

35 Claims, 4 Drawing Sheets

U.S. PATENT DOCUMENTS

| | | | |
|---|---|---|---|
| 6,646,998 B1 * | 11/2003 | Rasanen | 370/328 |
| 7,000,030 B2 * | 2/2006 | Rasanen et al. | 709/246 |
| 2001/0043588 A1 * | 11/2001 | Sallberg | 370/352 |

FOREIGN PATENT DOCUMENTS

| | | |
|---|---|---|
| EP | 0847174 | 6/1998 |
| EP | 0951186 | 10/1999 |
| WO | WO 92/22976 | 12/1992 |
| WO | WO 98/23045 | 5/1998 |
| WO | WO 99/16266 | 4/1999 |

\* cited by examiner

METHOD AND SYSTEM FOR ESTABLISHING A CONNECTION IN A TELECOMMUNICATION NETWORK HAVING DIFFERENT PROTOCOLS

This application is a continuation of international application serial number PCT/EP00/00527, filed 24 Jan. 2000.

FIELD OF THE INVENTION

The present invention relates to a method and system for establishing a connection in a telecommunication network, such as a mobile network.

BACKGROUND OF THE INVENTION

In recent years, multimedia telephone terminals which can be connected to fixed networks have been developed. These terminals provide real-time video, audio, or data, or any combination thereof, between two multimedia telephone terminals over a voice band network connection. Communication may be either one-way or two-way. A multipoint communication using a separate Multipoint Control Unit (MCU) among more than two terminals is also possible. Furthermore, the multimedia telephone terminals can be integrated into PCs or work stations, or can be stand-alone units.

Interworking with such visual telephone systems on mobile radio networks is defined in the ITU-T video/multimedia recommendation H.324/M.

However, in general, a calling party does not know in advance whether or not the terminal of a called party supports the connection type underlying a desired call. Thus, inconvenient error processings and disconnections may occur, if the terminal of the called party does not support the desired connection type, e.g. the multimedia connection.

SUMMARY OF THE INVENTION

It is therefore an object of the present invention to provide a method and system for establishing a connection, by means of which error processings and disconnections due to a capability mismatch can be prevented.

This object is achieved by a method for establishing a first type of connection in a telecommunication network, comprising the steps of:
  performing a handshake processing with a called party of said first type of connection;
  determining a second type of connection;
  checking the result of the handshake processing; and
  establishing the second type of connection, when the result of the checking step indicates that the handshake processing was not successful.

Furthermore, the above object is achieved by a system for establishing a first type of connection in a telecommunication network, comprising:
  negotiating means for performing a handshake processing with a called party of the first type of connection;
  determining means for determining a second type of connection;
  checking means for checking the result of the handshake processing; and
  connection control means for establishing the second type of connection in response to the checking result of the checking means.

Accordingly, a fallback solution is provided, wherein a fallback connection, i.e. the second type of connection, is determined, such that another type of connection supported by the called party or another connection to another service, such as a speech service, can be established without disconnecting the calling party or performing a time-consuming error processing or messaging at the end terminals.

The determination of the second type of connection may be achieved based on a monitoring operation performed in a network element arranged between the calling party and the called party. The network element may then perform a connection fallback from the first type of connection (e.g. multimedia call) to the second type of connection (e.g. speech call).

Alternatively, the network element may determine as the second type of connection at least one type of connection supported by the called party, by monitoring a signaling for call establishment, wherein the call to the called party is then re-established as a connection of the supported type. The determination result may be signaled to the calling party which then performs the call re-establishment operation. Thereby, the risk of clearing the call due to a long waiting period can be removed.

Preferably, the network element is an interworking unit of the telecommunication network.

The first type of connection, which can be a multimedia connection, is established, when the result of checking indicates that the handshake processing was successful, i.e. that the other party supports the first type of connection.

Preferably, the handshake processing is an interworking processing which may be performed by an interworking function provided at a mobile switching center of a mobile network.

The first type of connection may be a video connection, and may be established between a mobile terminal of a mobile network and a network terminal of a fixed network.

The second type of connection can be determined on the basis of the handshake processing, or by performing another handshake processing with the other party. Alternatively, the second type of connection can be determined on the basis of the calling number of the other party. Moreover, the second type of connection may be determined on the basis of a predetermined priority order. The second type of connection may be a speech connection or any other type of connection, e.g. a multimedia or video connection, supported by the called party.

Initially, an HSCSD (High Speed Circuit Switched Data) call may be established to the other party. Then, the other party may reply by transmitting a request for the first type of connection.

Furthermore, the second type of connection can be established by performing a channel mode modification and changing the switching at a switching means.

Preferably, the apparatus for establishing the first type of connection is a mobile switching center, wherein the negotiating means corresponds to an interworking function provided at said mobile switching center.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
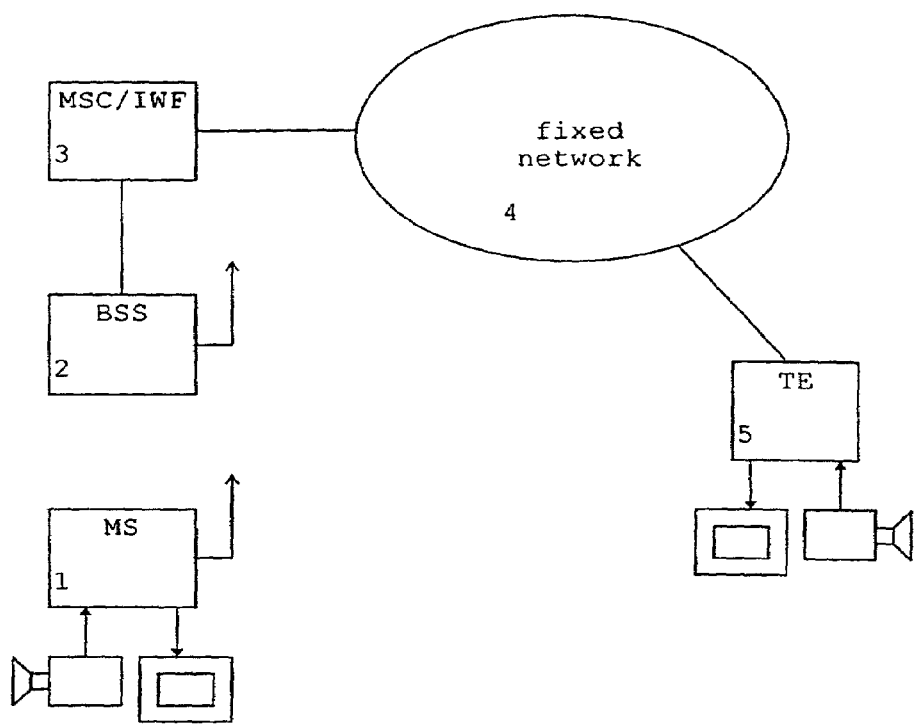
FIG. 1 shows a principle block diagram of a mobile network connected to a fixed network 4.

In the following, the present invention will be described on the basis of a preferred embodiment which relates to a multimedia connection between a fixed network 4 and a mobile network, as shown in FIG. 1.

According to FIG. 1, a multimedia end terminal (TE 5) is connected via the fixed network 4, such as a Public Switched Telephone Network (PSTN) or the like, to a mobile terminal or mobile station (MS 1) having a multimedia capability. The MS 1 is radio-connected to a Base Station Subsystem (BSS) 2 which is connected to a Mobile Switching Center (MSC/IWF) 3 having an interworking function. The interworking function is provided for adapting protocol features of the mobile network to protocol features of the fixed network 4.

According to the present invention, the MSC/IWF 3 is arranged to determine an auxiliary connection or fallback connection which is established in case the other party does not support a multimedia call.

Figure 2:
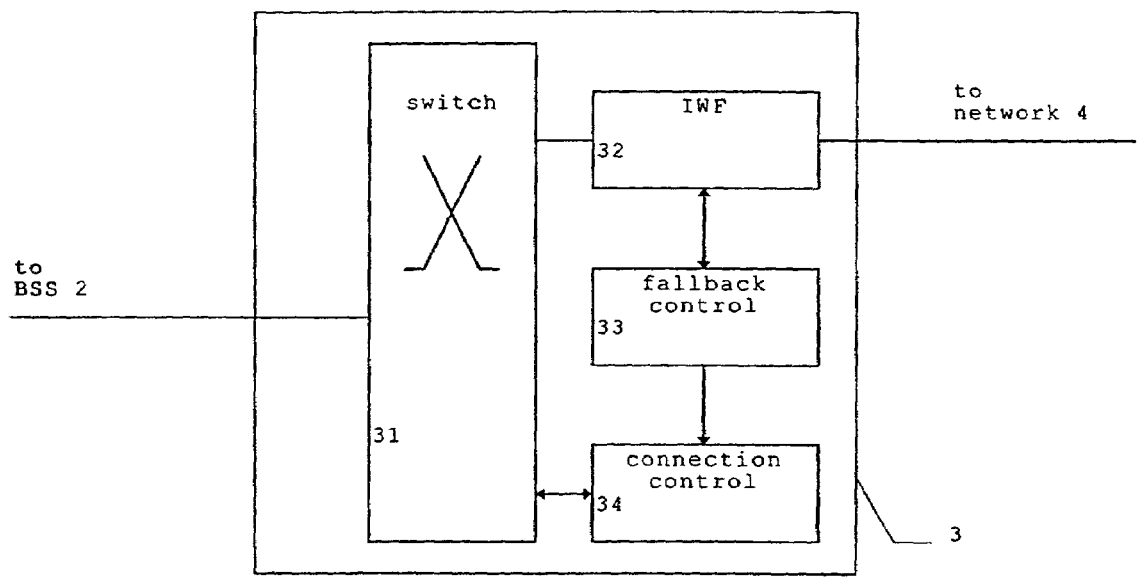
FIG. 2 shows a principle block diagram of a mobile switching center according to the preferred embodiment of the present invention.

FIG. 2 shows a principle block diagram of the MSC/IWF 3 according to the preferred embodiment of the present invention. According to FIG. 2, the MSC/IWF 3 comprises a switch 31 for performing a switching operation between the BSS 2 and the fixed network 4, so as to establish a requested connection. The switching operation of the switch 31 is controlled by a connection control unit 34 arranged to control the setup and establishment of the switched connections.

Furthermore, the MSC/IWF 3 comprises an interworking function (IWF) 32 which provides an interoperation with multimedia end terminals, such as the TE 5, over the fixed network 4. It is arranged to perform a transcoding, an error processing adaptation and a rate matching between the mobile network and the fixed network 4. Furthermore, the IWF 32 performs the negotiation processing in order to set up a voice band channel to the fixed network 4.

According to the preferred embodiment, the IWF 32 is connected to a fallback control unit 33 which is arranged to check the result of the negotiation performed by the IWF 32 and to control the connection control unit 34, so as to establish one of a multimedia connection and a fallback connection in response to the checking result.

Figure 3:
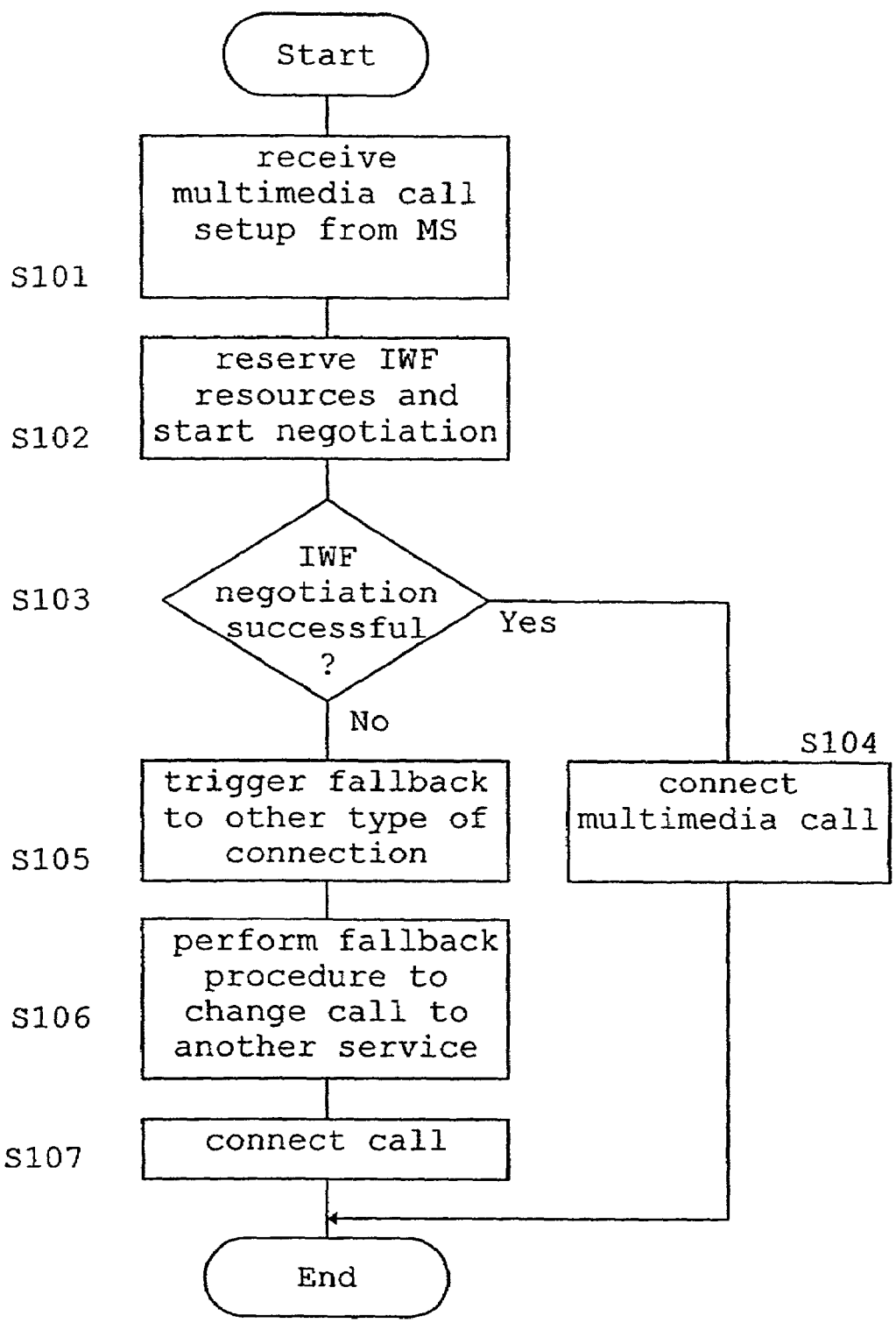
FIG. 3 shows a flow diagram of a procedure for establishing a mobile-originated multimedia connection according to the preferred embodiment of the present invention.

In the following, a processing performed by the MSC/IWF 3 in order to establish a mobile-originated multimedia connection is described with reference to FIG. 3.

Initially, the MS 1 requests a multimedia call, e.g. a H.324 call, and transmits a corresponding setup message to the MSC/IWF 3, which is received by the MSC/IWF 3 in step S101. The type of the requested call may be indicated e.g. in the Bearer Capability Information Element (BCIE) of the setup message.

Based on the received setup message, the MSC/IWF 3 checks the multimedia call, and the IWF 32 reserves the required interworking function resources and starts a handshake or negotiation processing with the fixed network 4 in order to set up the multimedia connection to the called party, e.g. the TE 5 (step S102). In particular, the negotiation processing may be a ITU-T V.8, V.8bis or V.140 procedure or the like.

Then, the fallback control unit 33 checks in step S103 whether the negotiation performed by the IWF 32 was successful, or not.

In case the fallback control unit 33 determines in step S103 that the negotiation was successful, it controls the connection control unit 34, so as to connect the multimedia call via the switch 31 (step S104). Thus, a connection such as a modem or UDI (Unrestricted Digital Information) connection is established between the IWF 32 and the called party, e.g. the TE 5.

If the fallback control unit 33 determines in step S103 that the negotiation was not successful, i.e. that the called party does not support the multimedia call, it triggers a fallback to another type of connection (step S105). The other type of connection may be determined on the basis of the negotiation performed by the IWF 32, or on the basis of an additional negotiation of the IWF 32, or on the basis of a default setting (e.g. fallback service such as speech), initiated by the fallback control unit 33.

Subsequently, the connection control unit 34 is controlled to perform a fallback procedure to change the actual call to another service, i.e. to switch the connection between the MS 1 and the MSC/IWF 3 to another service such as a speech service (step S106). This may be achieved by a channel mode modification of the channel between the MS 1 and the MSC/IWF 3, and a corresponding release of resources of the IWF 32, followed by a change of the switching performed by the switch 31 in the MSC/IWF 3. Finally, the call is connected via the fallback connection (step S107), such that the MS 1 is connected to an auxiliary or fallback service without disconnecting it or performing a time-consuming error processing or messaging.

Figure 4:
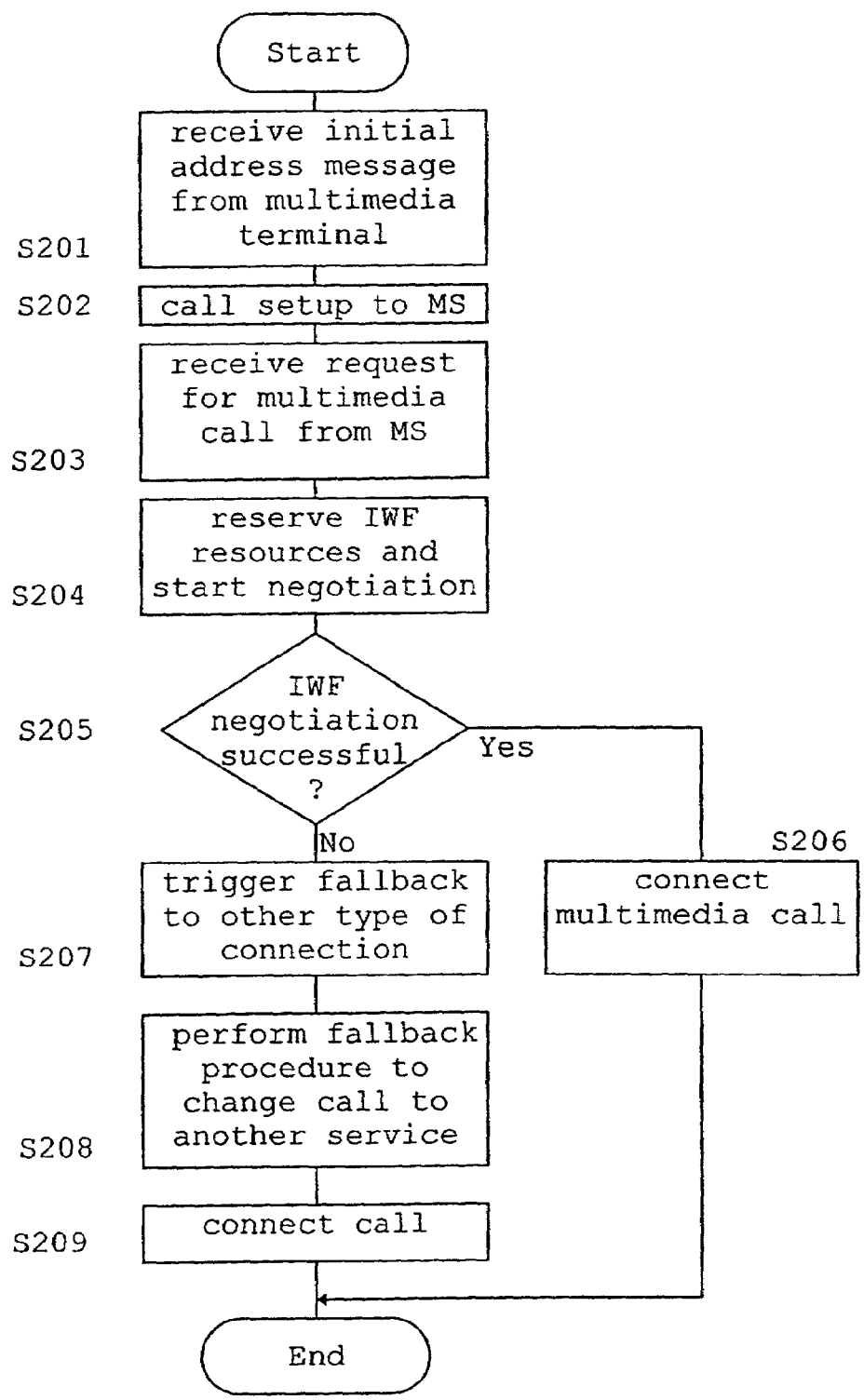
FIG. 4 shows a flow diagram of a procedure for establishing a mobile-terminated multimedia connection according to the preferred embodiment of the present invention.

In the following, an establishment of a mobile-terminated multimedia connection is described with reference to FIG. 4.

Initially, a setup message, e.g. an Initial Address Message (IAM) is received by the MSC/IWF 3 from a multimedia terminal, e.g. the TE 5, of the fixed network 4 (step S201). Based on the received initial address message and a subscriber related service information possibly stored in the Home Location Register (HLR) of the mobile network, the MSC/IWF 3 or the IWF 32 checks the multimedia call and the MSC/IWF 3 transmits a call setup message to the MS 1 via the BSS 2 (step S202). In particular, the call may be first established as a HSCSD (High Speed Circuit Switched Data) call, in order to provide a fast setup processing.

The setup message from the MSC/IWF 3 to the MS 1 may not contain a service definition at all, e.g. in case where a single numbering scheme is used and the setup message from the fixed network 4 does not contain any service definition.

Then, the MS 1 replies by transmitting a request message for a multimedia call, e.g. a H.324 call, wherein the requested call type may depend on the received calling number. Then, the MSC/IWF 3 receives the request message for the multimedia call in step S203 and controls the IWF 32, so as to reserve the corresponding interworking function resources, and to start a corresponding handshake or negotiation processing, e.g. V.8, V.8bis or V.140 negotiation or H.245-H.223 messages, with the called party of the fixed network 4 (step S204).

Then, the fallback control unit 33 checks whether the negotiation performed by the IWF 32 was successful, or not (step S205). In case the negotiation was successful, the fallback control unit 33 controls the connection control unit 34 so as to establish a multimedia connection via the switch 31 to the called party.

If the fallback control unit 33 determines that the negotiation was not successful, it triggers a fallback connection to another type of connection supported by the called party (step S207). The fallback connection is determined based on the dialled number of the called party or may be obtained as described in connection with the mobile-originated connection establishing according to FIG. 3.

Based on the determined fallback connection, the connection control unit 34 performs a fallback procedure in step S208, in order to change the call to another service corresponding to the fallback connection. Finally, the call is connected to the fallback connection (step S209) and the mobile-terminated call is established without any disconnection or error processing at the respective end terminals.

However, the above described fallback to a speech connection may lead to the problem that the far end party (e.g. the TE 5) has to wait for several seconds while the MSC/IWF 3 is detecting or checking the capabilities of the far end terminal. Thus, the far end party may clear the call "as a failure" during this waiting period. Such a rejection of the call setup and clearing of the call incurs a so-called cause code to be sent the MS 1 to thereby inform the user of the cause of the problem.

Figure 5:
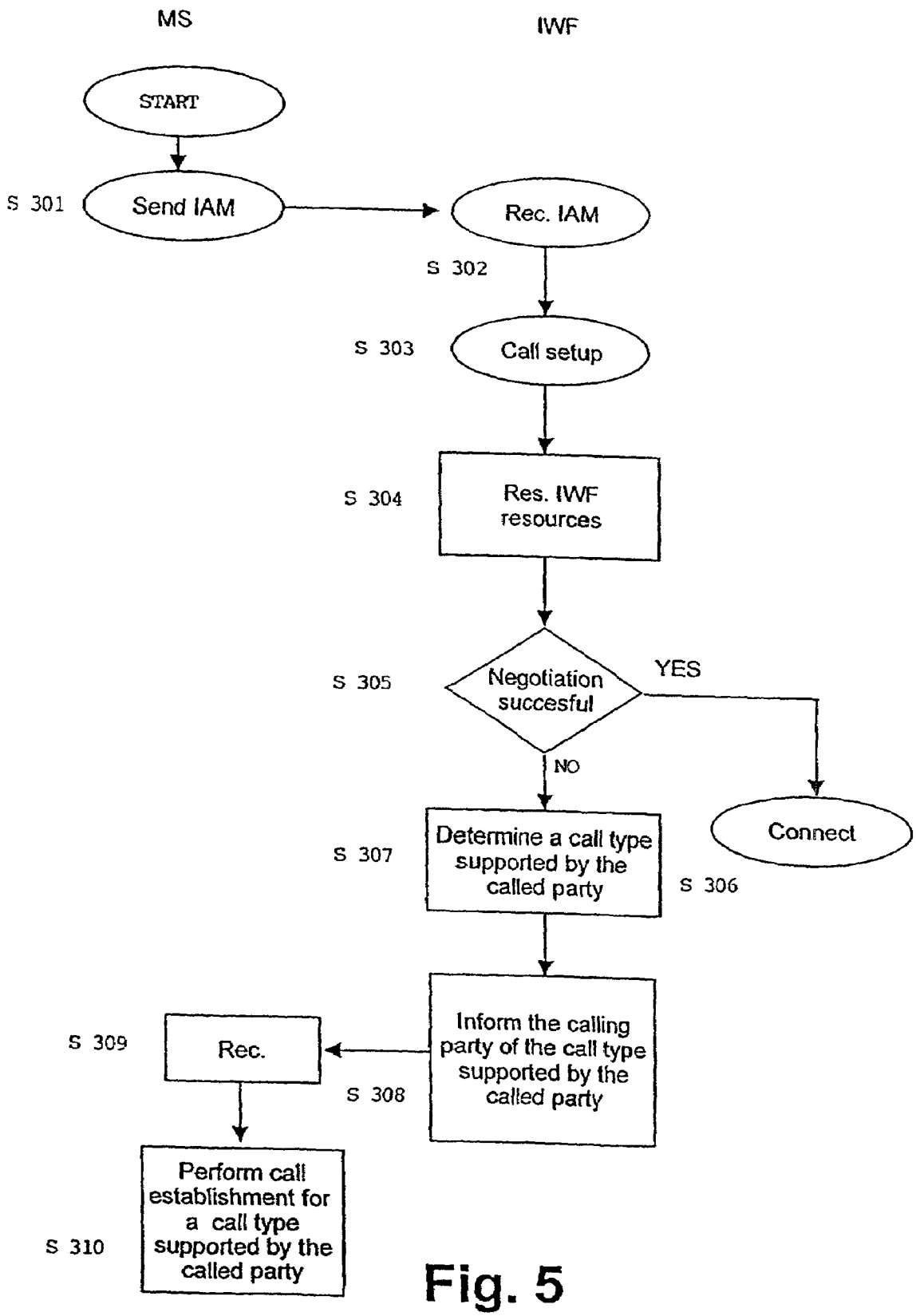
FIG. 5 shows a flow diagram of an alternative procedure for establishing a multimedia connection based on a call retry procedure according to the preferred embodiment of the present invention.

In the following, a call retry procedure by which the above problem can be prevented is described with reference to FIG. 5.

Initially, the MS 1 requests a multimedia call, e.g. a H.324 call, and transmits a corresponding Initial Address Message (IAM) to the MSC/IWF 3 (step S101). The IAM is received by the MSC/IWF 3 in step S302.

Based on the received IAM, the MSC/IWF 3 performs a call setup procedure (S303) and the IWF 32 reserves the required interworking function resources and starts the handshake or negotiation processing with the fixed network 4 in order to set up the multimedia connection to the called party, e.g. the TE 5 (step S304).

Then, the fallback control unit 33 checks in step S305 whether the negotiation performed by the IWF 32 was successful, or not.

In case the fallback control unit 33 determines in step S305 that the negotiation was successful, it controls the connection control unit 34, so as to connect the multimedia call via the switch 31 (step S306).

If the fallback control unit 33 determines in step S305 that the negotiation was not successful, i.e. that the called party does not support the multimedia call, it determines a call type supported by the called party (S307). The supported call type or types may be determined by monitoring and analyzing the initial inband or outband signaling for setup negotiation between the IWF 32 and the called party.

The result of the analysis, i.e. an information what the far end party can support, is then transmitted to the MS 1 in order to inform the calling party of the call type(s) supported by the called party (step S308). This transmittel may be performed by using the existing cause code mechanism and defining corresponding new parameter values.

Having received this information in step S309, the MS 1 initiates a call retry procedure based on the received information, e.g. using the new parameter values known to be supported by the far end party. Thus, the MS 1 performs a call establishment for a call type indicated as being supported by the called party (step S310). Thereby, in all propability, a successful call retry will be achieved.

As an alternative, the result of the above analysis of the supported call type(s), the network itself (e.g. the MSC/IWF 3) may perform the call retry towards the far end party. This may be achieved by providing a corresponding retry procedure in the IWF 32, which is initiated by the fallback control unit 33 and based on the new parameters obtained as a result of the analysis.

The retry mechanism may cover both network incompatibilities (e.g. UDI requested, but only RDI (Restricted Digital Information) or 3.1 kHz supported by the network; or RDI requested, but only 3.1 kHz supported by the network) and far end terminal incompatibilities (e.g. UDI/RDI requested, but only 3.1 kHz or speech supported by the far end terminal; or 3.1 kHz requested, but only speech supported by the far end terminal).

Hence, the called party does not have to wait uninformed or uncertain for something to happen. Actually, the waiting is done by the calling party during the "alerting period" of the call setup, which removes the risk of clearing the call before it has really started.

It is to be noted, that the processing performed by the MSC/IWF 3 may be implemented by a control program of a microprocessor such as a CPU, wherein the respective blocks 33 and 34 are replaced by corresponding software features provided in a ROM allocated to the CPU.

Furthermore, the connection establishment processing described in the above preferred embodiment can be performed in any telecommunication network to which terminals supporting different types of connections are connected, and is not restricted to a mobile switching center of a mobile network. Moreover, the fallback connection (i.e. second type of connection) is not restricted to a speech connection, but can be a multimedia connection or any type of connection supported by the called party.

Furthermore, the determination of the fallback connection may be performed by a combination of the above described possibilities, and a predetermined priority order may be allocated in case a plurality of fallback connections are determined.

The above description of the preferred embodiment and the accompanying drawings are only intended to illustrate the present invention. The preferred embodiment of the invention may vary within the scope of the attached claims.

In summary, the present invention relates to a method and system for establishing a connection, wherein a handshake processing is performed with the other party to establish a first type of connection. If the handshake processing is successful, the first type of connection is established. If the handshake processing is not successful, i.e. the other party does not support the first type of connection, a fallback procedure is started to change the call to a second type of connection determined during the connection establishment. The change to the second type of connection may be performed directly or may be based on a call retry procedure. Thereby, inconvenient disconnections or error processings at the end terminals can be prevented.

The invention claimed is:

1. A method, comprising:
   establishing a connection in a telecommunication network comprising different protocols, and an interworking function for adapting the different protocol features used for a connection between a calling terminal and the interworking function, and the interworking function and the called terminal;

receiving at the interworking function from a calling terminal a request to establish a connection of a first type (multimedia connection) using first protocol features;

performing a setup processing according to the first protocol features used for the first type of connection between the interworking function and the called terminal;

determining a second type of connection;

checking the result of said setup processing so as to indicate whether or not the setup processing according to the first protocol features has been successful; and, when said checking indicates that said setup processing was not successful, establishing said second type of connection between the interworking function and the called terminal and changing the connection between the calling terminal and the interworking function to the second type of connection.

2. A method according to claim 1, wherein said determining comprises a monitoring operation performed in a network element arranged between the calling terminal and said called terminal.

3. A method according to claim 2, wherein a connection fallback from said first type of connection to said second type of connection is performed in said network element.

4. A method according to claim 2, wherein at least one type of connection supported by said called terminal is determined as said second type of connection in said network element by monitoring a signaling for call establishment, and wherein the call is re-established based on the determination result.

5. A method according to claim 4, wherein the determination result is signaled to said calling terminal which then performs the call re-establishment operation.

6. A method according to claim 1, wherein said first type of connection is a multimedia connection.

7. A method according to claim 1, wherein said second type of connection is a speech connection.

8. A method according to claim 1, further comprising establishing said first type of connection, when said result of said checking indicates that said handshake processing was successful.

9. A method according to claim 1, wherein said first type of connection is a video connection.

10. A method according to claim 1, wherein said handshake processing is an interworking processing.

11. A method according to claim 1, wherein said first type of connection is a connection between a mobile terminal and a network terminal of a fixed network.

12. A method according to 1, wherein said second type of connection is determined on the basis of said handshake processing.

13. A method according to claim 1, wherein said second type of connection is determined by performing another handshake processing with said called terminal.

14. A method according to claim 1, wherein said second type of connection is determined on the basis of the calling number of said called terminal.

15. A method according claim 1, wherein said second type of connection is determined on the basis of a predetermined priority order.

16. A method according to claim 1, wherein said first type of connection is compliant with the ITU-T Recommendation H.324.

17. A method according to claim 1, wherein said second type of connection is established by performing a channel mode modification and changing switching.

18. A method according to claim 1, further comprising establishing a HSCSD call to said called terminal.

19. A system according to claim 1, wherein said interworking function is configured to check said first type of connection.

20. A system for establishing a connection in a telecommunication network comprising different protocols, the system comprising:

a negotiating module, implemented as an interworking function, configured to adapt the different protocol features used for a connection between a calling terminal and the interworking function and the interworking function and a called terminal, said negotiating module being configured to, when receiving at the interworking function from a calling terminal a request to establish a connection of a first type using first protocol features, perform a setup processing according to the first protocol features used for the first type of connection between the interworking function and the called terminal;

a determining unit configured to determine a second type of connection;

a checking unit configured to check a result of said setup processing so as to indicate whether or not the setup processing according to the first protocol features has been successful; and a connection control unit configured to establish said second type of connection between the interworking function and the called terminal and to change the connection between the calling terminal and the interworking function to the second type of connection, in response to the checking result of said checking unit.

21. A system according to claim 20, wherein said determining unit is provided in a network element arranged between the calling terminal and said called terminal, and is configured to perform a monitoring operation.

22. A system according to claim 21, wherein a connection fallback from said first type of connection to said second type of connection is performed in said network element.

23. A system according to claim 21, wherein at least one type of connection supported by said called terminal is determined as said second type of connection in said determining unit by monitoring a signaling for call establishment, wherein said connection control unit is configured to re-establish the call based on the determination result.

24. A system according to claim 23, wherein said connection control unit is arranged at said calling terminal, and wherein the determination result is signaled by said determining unit to said calling terminal.

25. A system according to claim 21, wherein said network element is an interworking unit.

26. A system according to claim 25, wherein said interworking unit is configured to check said first type of connection.

27. A system according to claim 20, wherein said first type of connection is a multimedia connection.

28. A system according to claim 20, wherein said second type of connection is a speech connection.

29. A system according to claim 20, wherein said determining unit is configured to determine said second type of connection on the basis of an information obtained from said handshake processing.

30. A system according to claim 20, wherein said determining unit is configured to determine said second type of connection by performing another handshake processing with said called terminal.

31. A system according to claim 20, wherein said determining unit is configured to determine said second type of connection on the basis of the calling number of said called terminal.

32. A system according to claim 20, wherein said determining unit is configured to determine said second type of connection on the basis of a predetermined priority order.

33. An interworking function, comprising:
negotiating means for adapting different protocol features used for connections with a calling terminal and a called terminal, said negotiating means being configured to, when receiving a request to establish a connection of a first type using first protocol features from a calling terminal, perform a setup processing according to the first protocol features used for the first type of connection with the called terminal;
determining means for determining a second type of connection;
checking means for checking a result of said setup processing so as to indicate whether the setup processing according to the first protocol features has been successful; and
connection control means for establishing said second type of connection between with the called terminal and changing the connection with the calling terminal to the second type of connection, in response to the checking result of said checking means.

34. A system for establishing a connection in a telecommunication network comprising different protocols, the system comprising:
negotiating means implemented as an interworking function for adapting the different protocol features used for a connection between a calling terminal and the interworking function and the interworking function and a called terminal, said negotiating means being adapted for, when receiving at the interworking function from a calling terminal a request to establish a connection of a first type using first protocol features, performing a setup processing according to the first protocol features used for the first type of connection between the interworking function and the called terminal;
determining means for determining a second type of connection;
checking means for checking a result of said setup processing so as to indicate whether or not the setup processing according to the first protocol features has been successful; and
connection control means for establishing said second type of connection between the interworking function and the called terminal and changing the connection between the calling terminal and the interworking function to the second type of connection, in response to the checking result of said checking means.

35. An interworking function, comprising:
a negotiating unit configured to adapt different protocol features used for connections with a calling terminal and a called terminal, said negotiating unit being configured to, when receiving a request to establish a connection of a first type using first protocol features from a calling terminal, perform a setup processing according to the first protocol features used for the first type of connection with the called terminal;
a determining unit configured to determine a second type of connection;
a checking unit configured to check a result of said setup processing so as to indicate whether the setup processing according to the first protocol features has been successful; and
a connection control unit configured to establish said second type of connection between with the called terminal and to change the connection with the calling terminal to the second type of connection, in response to the checking result of said checking unit.

* * * * *